(12) United States Patent
Sharma et al.

(10) Patent No.: US 12,086,843 B2
(45) Date of Patent: *Sep. 10, 2024

(54) INTEGRATION OF RETAIL SERVICES WITH SEARCH ENGINE

(71) Applicant: NCR Voyix Corporation, Atlanta, GA (US)

(72) Inventors: Om Prakash Sharma, Singoli (IN); Sandeep Reddy Chennu, Hyderabad (IN); Rajesh Goud Marka, Hyderabad (IN); Praveena Kollipara, Andhra Pradesh (IN); Joanna Ruth Nelapudi, Hyderabad (IN); Soumya Satt, Suncity (IN); Aditya Sharma, Suncity (IN)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,409

(22) Filed: Oct. 14, 2022

(65) Prior Publication Data

US 2023/0037835 A1 Feb. 9, 2023

Related U.S. Application Data

(63) Continuation of application No. 17/083,450, filed on Oct. 29, 2020, now Pat. No. 11,538,072.

(51) Int. Cl.
*G06Q 30/00* (2023.01)
*G06F 16/9535* (2019.01)
(Continued)

(52) U.S. Cl.
CPC ..... *G06Q 30/0277* (2013.01); *G06F 16/9535* (2019.01); *G06Q 30/0239* (2013.01); *G06Q 30/0256* (2013.01); *G06Q 30/0643* (2013.01)

(58) Field of Classification Search
CPC .......... G06Q 30/0277; G06Q 30/0239; G06Q 30/0256; G06Q 30/0643; G06F 16/9535
See application file for complete search history.

(56) References Cited

U.S. PATENT DOCUMENTS 9,747,621 B1  8/2017  Kuruvila
10,015,554 B1  7/2018  Verma et al.
(Continued)

OTHER PUBLICATIONS

S. Agrawal, L. M. Sanagavarapu and Y. Reddy, "FACT—Fine grained Assessment of web page CredibiliTy," TENCON 2019-2019 IEEE Region 10 Conference (TENCON), 2019, pp. 1088-1097, doi: 10.1109/TENCON.2019.8929515. (Year: 2019).*

(Continued)

*Primary Examiner* — Sun M Li
(74) *Attorney, Agent, or Firm* — Schwegman Lundberg & Woessner, P.A.

(57) ABSTRACT

Dynamic and Customized web pages provided by a search engine to link to a retailer's online site are redirected to an integration platform when activated within a browser from search results of a user search. The integration platform segments the web pages into a plurality of sub links that when detected from the activation, which resulted in the browser redirection to the integration platform, cause specific retailer services to be accessed by the integration platform and customized information and services provided to the user within the browser.

20 Claims, 3 Drawing Sheets

(51) Int. Cl.
    *G06Q 30/0207*     (2023.01)
    *G06Q 30/0241*     (2023.01)
    *G06Q 30/0251*     (2023.01)
    *G06Q 30/0601*     (2023.01)

(56) References Cited

U.S. PATENT DOCUMENTS

| | | | |
|---|---|---|---|
| 2002/0072974 | A1 | 6/2002 | Pugliese, III et al. |
| 2004/0098313 | A1 | 5/2004 | Agrawal |
| 2007/0038600 | A1* | 2/2007 | Guha .................... G06F 16/951 |
| 2007/0038601 | A1* | 2/2007 | Guha .................... G06F 16/332 |
| 2009/0282021 | A1* | 11/2009 | Bennett ............... G06F 16/3326 |
| | | | 707/999.005 |
| 2011/0320429 | A1* | 12/2011 | Doig ................... G06F 16/9538 |
| | | | 707/711 |
| 2015/0039444 | A1* | 2/2015 | Hardin ................... H04L 41/06 |
| | | | 705/14.69 |
| 2015/0206215 | A1 | 7/2015 | Bui |
| 2016/0019598 | A1* | 1/2016 | Harrison ............ G06Q 30/0277 |
| | | | 705/14.71 |
| 2016/0379213 | A1* | 12/2016 | Isaacson ............ G06Q 20/3678 |
| | | | 705/44 |
| 2017/0206282 | A1* | 7/2017 | Kumar .................... G06F 40/14 |
| 2017/0322929 | A1 | 11/2017 | Hussain et al. |
| 2021/0160551 | A1 | 5/2021 | Hou |

OTHER PUBLICATIONS

Solano A, Dormido R, Duro N, González V. One-Time URL: A Proximity Security Mechanism between Internet of Things and Mobile Devices. Sensors (Basel). 2016;16(10):1694. Published Oct. 13, 2016. doi: 10.3390/s16101694 (Year: 2016).*

A. Alhenshiri, S. Brooks, C. Watters and M. Shepherd, "Augmenting the visual presentation of Web search results," 2010 Fifth International Conference on Digital Information Management (ICDIM), Thunder Bay, ON, Canada, 2010, pp. 101-107, doi: 10.1109/ICDIM.2010.5664665. (Year: 2010).*

D. Q. Nguyen and H. Schumann, "Visualization to Support Augmented Web Browsing," 2013 IEEE/WIC/ACM International Joint Conferences on Web Intelligence (WI) and Intelligent Agent Technologies (IAT), Atlanta, GA, USA, 2013, pp. 535-541, doi: 10.1109/WI-IAT.2013.75. (Year: 2013).*

R. G. Cattelan, D. Kirovski and D. Vijaywargi, "Serving Comparative Shopping Links Non-invasively," 2009 IEEE/WIC/ACM International Joint Conference on Web Intelligence and Intelligent Agent Technology, Milan, Italy, 2009, pp. 498-507, doi: 10.1109/WI-IAT.2009.84. (Year: 2009).*

S. Agrawal, L. M. Sanagavarapu and Y. Reddy, "FACT—Fine grained Assessment of web page CredibiliTy," TENCON 2019-2019 IEEE Region 10 Conference (TENCON), 2019, pp. 1088-1097, doi: 10.1109/TENCON.2019.8929515.. (Year: 2019) (Year: 2019).*

Bujlow, T., "A Survey on Web Tracking: Mechanisms, Implications, and Defenses", in Proceedings of the IEEE, vol. 105, No. 8, Aug. 2017, doi: 10.1109 FPROC.2015.2637878 (Year: 2017), (Aug. 2017), 34 pgs.

Lnvemizzi, L, "Cloak of Visibility: Detecting When Machines Browse a Different Web", IEEE Symposium on Security and Privacy (SP), (2016), 743-758.

U.S. Appl. No. 17/083,450 U.S. Pat. No. 11,538,072, filed Oct. 29, 2020, Integration of Retail Services with Search Engine.

* cited by examiner

INTEGRATION OF RETAIL SERVICES WITH SEARCH ENGINE

CROSS-REFERENCE TO RELATED APPLICATION

This application is a continuation of U.S. patent application Ser. No. 17/083,450, filed Oct. 29, 2020, which application and publication is incorporated herein by reference in its entirety.

BACKGROUND

The COVID19 pandemic has changed many retail-based business practices based on current public health directives. Governments are now advising citizens to minimize virus exposure times by staying at home as much as possible and only leaving home for necessities while wearing masks and observing social distancing rules. Yet, retailers have designed store layouts, checkout systems, advertising, and product shelf placement to encourage customers to come to their stores and stay within their stores for as long as possible.

Online consumer transactions were already growing at surprising rates before the pandemic with online sales growth consistently eclipsing in-store sales growth year over year. Now retailers are actively attempting to reduce in-store customer traffic at the same time that consumers are intentionally avoiding in-store purchases whenever feasible. The result has been exponential online sales growth even for traditional grocery stores, which were not experiencing large online sales pre-pandemic, but some retailers have not benefit as much as they believe they should be during the pandemic.

Online sales are largely driven by the search engines for consumers who do not use online aggregators, such as Amazon®. Unfortunately, search engines pitch their preferred retailers in search results and some search engines redirect purchases to their own purchasing services. Moreover, many retailers lack any substantial online presence and most consumers are unaware that local retailers may have online ordering services. As a result, retailers are struggling during the pandemic to achieve the online sales growth that they should be experiencing.

Further, COVID19 has disrupted product supply chains and manufacturing product inventories. Consequently, consumers are actually venturing out of their homes for products only to find that such products are out-of-stock. This is frustrating to both the consumers, retailers, suppliers, and manufacturers; and this potentially exacerbating the spread of COVID19 by increasing virus exposure times.

Most consumers, who want a product immediately, are reluctant to order the product online when delivery dates are estimated to be in the distant future (e.g., more than a few weeks out from the online order date). Typically, a search engine will not identify whether a product in its search results is in-stock or out-of-stock for any given retailer and consumers must click a variety of links to checkout with the product before the consumers discover that the product is out-of-stock. Many search results for products include links to a single retailer site that manages all stores for that retailer. So, the consumer has to make sure they go through more interface screens to ensure they are at the proper store of the retailer where they want to pick up an online order. Additionally, a significant number of popular retailers have multiple stores within a few miles from the consumer's location and many consumers do not know the address to the closest retailer (they know how to get there from their homes, but they do not know the actual address). This further complicates the online ordering experience for the consumer. Some consumers may actually show up at the wrong store from where they originally placed an order.

As a result, consumers are placing more online orders (particularly because of the pandemic) but are frustrated and confused by a variety of issues: product availability, ease of online ordering, and store locations. Similarly, retailers are frustrated because they feel like they are not benefiting from the surge in online orders and they feel as if the search engines are not being particularly beneficial when their customers are looking for their products, and in some cases, the search engines may be actively steering consumers away from the retailer's products.

SUMMARY

In various embodiments, methods and a system for integration of retail services with a search engine are presented.

According to an aspect, a method for integration of retail services with a search engine is presented. For example, an activation is received from a browser operated by a user and a reference associated with the activation is identified. An Application Programming Interface (API) associated with the reference is obtained and a retailer service associated with a retailer is interacted with using an API call of the API based on the reference. Information returned from the retailer service based on the API call is rendered within a web page for presentation within the browser to the user.

DETAILED DESCRIPTION

Figure 1:
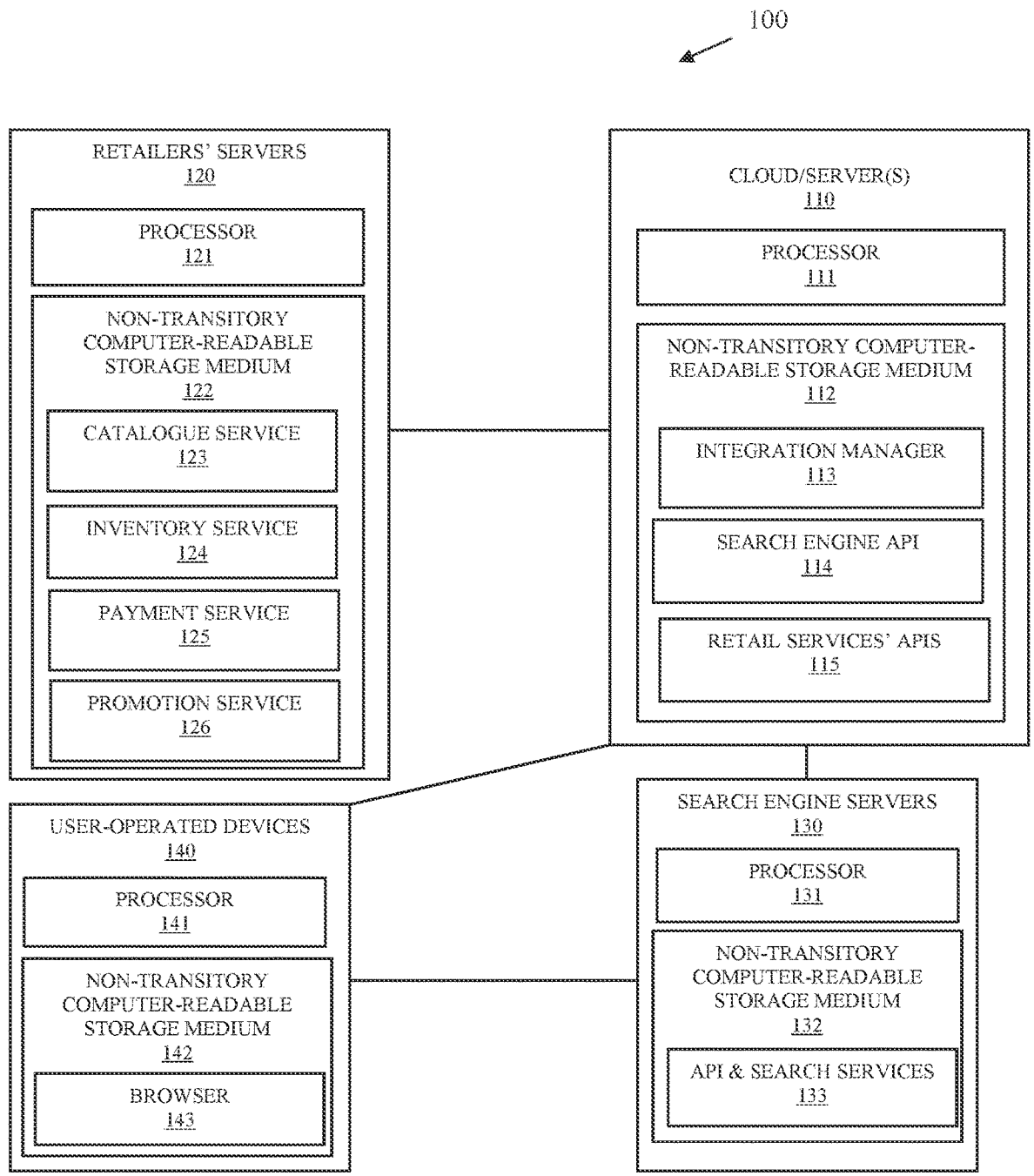
FIG. 1 is a diagram of a system for integration of retail services with a search engine, according to an example embodiment.

FIG. 1 is a diagram of a system 100 for integration of retail services with a search engine, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of integration of retail services with a search engine presented herein and below.

As will be discussed more completely herein and below, system 100 provides a platform, devices, and executable instructions that integrate a retailer's services into search results of a search engine allowing a consumer/user to directly place online orders with the consumer's retailer of choice.

System 100 comprises a cloud/server 110, a plurality of retailer services, search engine servers 130, and user-operated devices 140.

Cloud/server 110 comprises a processor 111 and a non-transitory computer-readable storage medium 112. Medium 112 comprises executable instructions for an integration manager 113, search engine API 114, and retailer services' APIs 115.

Each retailer server 120 comprises a processor 121 and a non-transitory computer-readable storage medium 122. Medium 122 comprises executable instructions for a product catalogue service 123, a product inventory service 124, a payment service 125, and a promotion service 126.

Each search engine server 130 comprises a processor 131 and a non-transitory computer-readable storage medium 132 having executable instructions comprising an API and search services 133.

Each user-operated device 140 comprises a processor 141 and a non-transitory computer-readable storage medium 142 having executable instructions comprising a web browser 143.

Each processor of each device/server when provided the corresponding executable instructions from the corresponding medium causes that processor to perform operations associated with the corresponding 113-115, 123-126, 133, and 143), as discussed below with integration manager 113, search engine API 114, retailer services' APIs 115, catalogue service 123, inventor service 124, payment service 125, promotion service 126, API and search services 133, and browser 143.

Research indicates that when consumers desire to buy a product these consumers begin by performing a search within a search engine of a browser. Moreover, 81% of consumers conduct online product research before they make a purchase.

Search engines (such as Google®, Bing®, Yahoo®, etc.) provide an automated mechanism for dynamically rendering web content as ads for retailer products associated with search results of consumers. These customized web pages provided as advertisements usually include minimal information and capabilities, such product images and product prices, and usually these customized web pages include a single capability (as a link) that when activated redirects the consumer to the online ordering interface of the retailer. There is no information about whether there is a particular store in vicinity of the consumer performing the search, there is no information for whether the product is in-stock with the retailer or out-of-stock with the retailer, and there is no ability for the consumer to directly link to and integrated with backend payment systems of the retailer to order the product through the retailer for delivery or pickup at a given retailer store. All these issues are solved with system 100.

When a consumer performs a search within a search engine from browser 143, API and search services 133 obtain a variety of consumer information as metadata (such as location data for device 140, device identifier for device 140, any permitted cookie data from browser 143, the search text associated with the search, and other metadata). When a retailer ad is clicked by the consumer within the browser 143 and the link is traversed within the browser 143 that information is provided by API and search services 133 to the referenced link source or is provided from the browser 143 to the referenced linked source.

Integration manager 113 utilizes the metadata provided by API and search services 133 and/or browser 143 to provide customized web pages (ads) for retailers subscribed to the integration services provided by cloud/server 110.

Custom ads are provided for the retailers within the dynamically rendered web page presented by API and search services 133 within browser 143 to the consumer. These ads comprise not just a single capability that links to a retailer's online web interface but rather include links to cloud/server 110 with the rendered web page comprising a plurality of links to specific backend retailer services, which can be processed when activated by the consumer through browser 143 by integration manager 113 using retailer services' APIs 115 to provide a variety of fine-grain functionality associated with the retailer to the consumer through browser 143. The fine-grain functionality processed by integration manager 113 using APIs 115 include catalogue services 123 (for obtaining product details, images, and pricing), inventory services 124 for obtaining current inventory status and counts for any given product of the catalogue, and payment services 125 for processing payments for the product, and promotion services 126 for providing available product incentives (coupons, rebates, discounts).

The dynamically rendered ad provided by integration manager 114 is constructed using metadata provided by API & search services 113 through search engine API 114. Location data from API and search services 133 provided through API 114 allows integration manager 113 to identify specific store locations that are nearest in proximity to the user-operated device 140 from where the search originated. Moreover, the search text can be used to identify the specific product of the retailer that is being presented with the search results as an ad by API and search services 133 within browser 143. A specific retailer service API 115 is processed to interact with the specific retailer server 120 for the retailer and search catalogue services 123 for product description, details, and pricing; search inventory service for up-to-date product inventory; provide current product incentives via promotion service 126, and process a purchase order by the consumer for the product through payment service 125.

The dynamically rendered ad comprises one to seven links that when activated redirect the browser 143 to integration manager 113. The links are displayed within the ad as labels for features that activate store locations near the consumer, product inventory or availability, discounts or rebates available for the product from the retailer, product description, details, and pricing, buy now, buy online through retailer online site, and/or pay later show product availability.

When a corresponding link is clicked by a consumer within browser 143 and redirected to integration manager 113, the corresponding API 115 for the specific retailer is activated using browser-provided or search-engine provided metadata. For example, a stores near me link causes integration manager 113 to identify from the metadata the retailer associated with the ad, obtain location data for user-operated device 140, and compare the location data against known location data for retailer stores of that retailer. This can then be displayed within a web page with contact information for the stores, distance of each store to the consumer, address information. The web page may also include other links for buy now, pay later see product inventory, product availability, promotions, etc. for each of the stores. Since after the initial ad is clicked, manager 113 can use APIs 115 to activate catalogue service 123, inventory service 124, payment service 125, and promotion service for each of the stores presented as being near the consumer.

A pay now feature clicked allows integration manager 113 to present web pages associated with purchasing the specific product with a specific store using API 115 and payment service 125 of the specific store or retailer of that store. Integration manager 113 uses API 115 that corresponds to the payment service 125 and populates the web page with known metadata associated with the consumer. The consumer can then fill out the rest of the order with payment details to complete the order with the specific retailer. In another case, integration manager 113 presents a payment web page for filling out by the consumer through browser 143 and submits the order for payment with payment service 125 or processes the payment and submits a confirmed order to an order service of the specific retailer using an appropriate API 115.

A product availability or pay later see availability link clicked allows integration manager 113 to use an appropriate API 115 and a product identifier associated with the initial ad and search inventory service 124. Manager 113 then renders the availability or the product in a web page through browser 143 to the consumer. The availability presented within the web page may be a total number of the product that is available (such as 10 left in stock) or may just simply state in-stock or out-of-stock.

A product description and pricing link clicked allows integration manager 113 to use an appropriate API 115 and search catalogue service 123 for the entire product record of the product comprise product description, product images, product pricing, product nutritional information, product specification, etc. All information or selective information from the product record can be rendered in a web page presented within the browser 143 to the consumer.

A pay online with the retailer link clicked causes manager 113 to redirect the browser of the consumer directly to the online service of the specific retailer for the product presented in the ad.

A promotions linked clicked causes manager 113 to use an appropriate API 115 and search promotion service 126 with the product identifier associated with the ad presented within browser 143 to the consumer. A web page is then rendered within browser showing all retailer-provided incentives for buying the product from the specific retailer, such as coupons, discounts, offers, rebates, etc.

System 100 permits a retailer to provide a more informative and enticing presentation of a retailer's product within a dynamically rendered ad provided by a search engine. The dynamically rendered redirects to integration manager 113 when the ad is clicked, details of the click identify subcomponents or images that were presented within the ad. This allows manager 113 to identify which feature within the ad was clicked and essential creates real sub links that are processed by manager 113. So, a single dynamically created ad web page rendered by API and search services 133 on behalf of a retailer with a single capability (accessed by clicking on the ad) creates a multi-feature and multi-link ad that directly interacts with the retailer's online services. System 100 is easy to integrate with multiple subscribing retailers and their services and is operational with a full suite of retailer-specific services having real-time information once the customized ad is directed to integration manager 113 and APIs 115 are provided for the retailer. The ads are more functional for the consumer giving the consumer information that is useful and access to instantly buy or order a given retailer's product.

In an embodiment, an additional feature may be added to the customized ad for scheduling a time slot or making a reservation. In such an embodiment, an API 115 is provided for accessing the retailer's scheduling or reservation system. This is particularly useful for restaurants and retail stores during the COVID19 pandemic.

In an embodiment; user-operated devices 140 may comprise laptops, tablets, wearable processing devices, voice and network enabled devices (Amazon® Echo®, Google® Home®, etc.), phones, vehicle-enabled computing devices, desktops, intelligent appliances, and other Internet-of-Things (IoT) devices.

In an embodiment, cloud/server 110 that provides integration manager 113 and APIs 115 can be subscribed to for any negotiable fee (per click, per month, per product sales, etc.) by retailers to handle their search result hits within a search engine and search engine placed ads.

In an embodiment, the search engine for which the integration manager 113 provides integration with is any standalone Internet-based search engine or a search engine integrated into a social media platform (Facebook®, Twitter®, etc.).

These and other embodiments are now discussed with reference to FIGS. 2-3.

Figure 2:
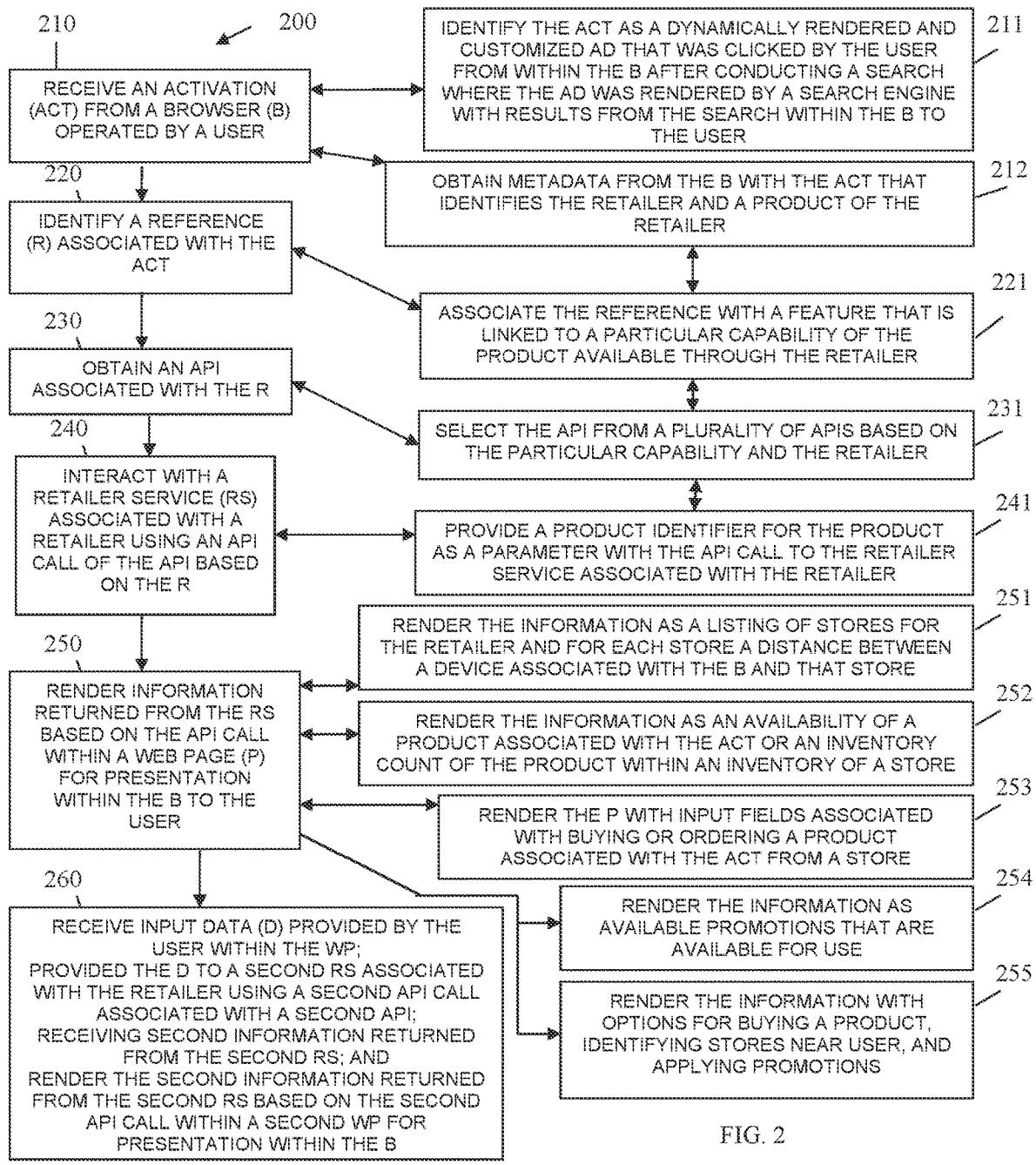
FIG. 2 is a diagram of a method for integration of retail services with a search engine, according to an example embodiment.

FIG. 2 is a diagram of a method 200 for integration of retail services with a search engine, according to an example embodiment. The software module(s) that implements the method 200 is referred to as a "search engine integration manager." The search engine integration manager is implemented as executable instructions programmed and residing within memory and/or a non-transitory computer-readable (processor-readable) storage medium and executed by one or more processors of a device. The processor(s) of the device that executes the search engine integration manager are specifically configured and programmed to process the search engine integration manager. The search engine integration manager has access to one or more network connections during its processing. The network connections can be wired, wireless, or a combination of wired and wireless.

In an embodiment, the device that executes the search engine integration manager is server 110. In an embodiment, the server 110 is a cloud processing environment that comprises multiple servers cooperating with one another as a single server 110.

In an embodiment, the search engine integration manager is all of or some combination of 113-115.

In an embodiment, the search engine integration manager performs the processing discussed above with system 100.

In an embodiment, the search engine integration manager provides a retailer search engine integration platform. In an embodiment, the search engine can be any standalone Internet search engine or any social media search engine.

At 210, the search engine integration manager receives an activation from a browser operated by a user.

In an embodiment, at 211, the search engine integration manager identifies the activation as a dynamically rendered and customized ad that was clicked on by the user from within the browser after conducting a search. The ad was rendered by a search engine with results from a search within the browser to the user.

In an embodiment, at 212, the search engine integration manager obtains metadata from the browser with the activation that identifies a retailer and a product of the retailer.

At 220, the search engine integration manager identifies a reference associated with the activation.

In an embodiment of 212 and 220, at 221, the search engine integration manager associates the reference with a feature that is linked to a particular capability of the product available through or offered by the retailer.

At 230, the search engine integration manager obtains an API associated with the retailer.

In an embodiment of 221 and 230, at 231, the search engine integration manager selects the API from a plurality of APIs based on the particular capability and the retailer.

At 240, the search engine integration manager interacts with a retailer service associated with the retailer using an API call based on the retailer and the reference.

In an embodiment of 231 and 240, at 241, the search engine integration manager provide a product identifier for the product as a parameter with the API call to the retailer service associated with the retailer.

At 250, the search engine integration manager renders information returned from the retailer service based on the API call within a web page for presentation within the browser to the user.

In an embodiment, at 251, the search engine integration manager renders the information as a listing of stores for the retailer and for each store a distance between a device associated with the browser and that store.

In an embodiment, at 252, the search engine integration manager renders the information as an availability of the product associated with the activation or an inventory count of the product within an inventory of a store associated with the retailer.

In an embodiment, at 253, the search engine integration manager renders the web page with input fields associated with buying or ordering the product associated with the activation from the store of the retailer.

In an embodiment, at 254, the search engine integration manager renders the information as available promotions that are available for use by the user when purchasing or ordering the product from a store of the retailer.

In an embodiment, at 255, the search engine integration manager renders the information along with selectable options for buying the product associated with the activation, identifying stores in proximity to the user who is operating a device that executes the browser, and applying any promotions being provided by the retailer for the product.

In an embodiment, at 260, the search engine integration manager receives input data provided by the user within input fields of the web page. The search engine integration manager provides the input data to a second retailer service using a second API call associated with a second API. The search engine integration manager receives second information returned from the second retailer service, and the search engine integration manager renders the second information returned from the second retailer service based on the second API call within a second web page rendered for presentation within the browser to the user.

Figure 3:
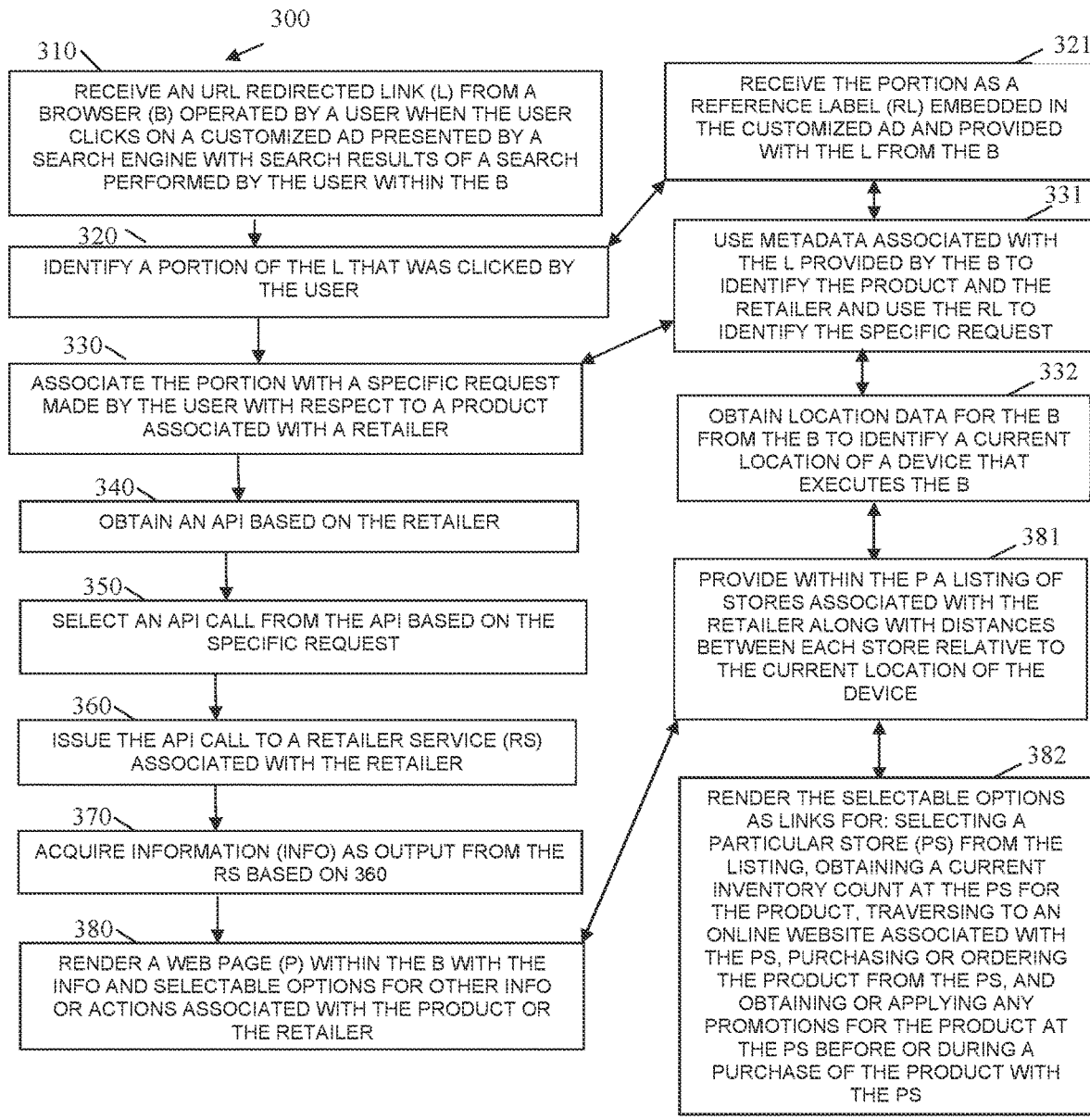
FIG. 3 is a diagram of another method for integration of retail services with a search engine, according to an example embodiment.

FIG. 3 is a diagram of another method 300 for integration of retail services with a search engine, according to an example embodiment. The software module(s) that implements the method 300 is referred to as a "retail service integration manager." The retail service integration manager is implemented as executable instructions programmed and residing within memory and/or a non-transitory computer-readable (processor-readable) storage medium and executed by one or more processors of a device. The processors that execute the retail service integration manager are specifically configured and programmed to process the retail service integration manager. The retail service integration manager has access to one or more network connections during its processing. The network connections can be wired, wireless, or a combination of wired and wireless.

In an embodiment, the device that executes the retail service integration manager is server 110. In an embodiment, the server 110 is a cloud processing environment that comprises multiple servers cooperating with one another as a single server 110.

In an embodiment, the retail service integration manager is all or some combination of 113-115, and/or the method 200.

In an embodiment, the crowd-sourced shopping visit manager provides and manages a search engine integration platform. In an embodiment, the search engine is any standalone Internet search engine or any proprietary social media search engine.

The retail service integration manager presents another and, in some ways, enhanced processing perspective to that which was described above with the FIG. 2.

At 310, the retail service integration manager receives an URL redirected link from a browser operated by a user when the user clicks on a customized ad presented by a search engine with search results of a search performed by the user within the browser.

At 320, the retail service integration manager identifies a portion of the URL redirected link that was clicked on by the user.

In an embodiment, at 321, the retail service integration manager receives the portion as a reference label embedded within the customized ad and provided by the URL redirected link from the browser.

At 330, the retail service integration manager associated the portion with a specific request made by the user with respect to a product associated with the retailer.

In an embodiment of 321 and at 330, at 331, the retail service integration manager uses metadata associated with the URL redirected link provided by the browser to identify the product and the retailer and uses reference label to identify the specific request.

In an embodiment of 331 and at 332, the retail service integration manager obtains location data for the browser from the browser to identify a current location of a device that executes the browser (which gives a current location of the user).

At 340, the retail service integration manager obtains an API based on the retailer.

At 350, the retail service integration manager selects an API call from the API based on the specific request.

At 360, the retail service integration manager issues the API call to a retailer service associated with the retailer.

At 370, the retail service integration manager acquires information as output from the retailer service based on 360.

At 380, the retail service integration manager renders a web page within the browser with the information and with selectable options for other information or actions associated with the product or the retailer.

In an embodiment of 332 and 380, at 381, the retail service integration manager provides within the web page a listing of stores associated with the retailer along with distances between each store relative to the current location of the device being operated by the user.

In an embodiment of 381 and at 382, the retail service integration manager renders the selectable options as links for: selecting a particular store from the listing of stores that are proximate to the user, obtaining a current inventory count at the particular store for the product, traversing to an online website associated with the particular store, purchasing or ordering the product from the particular store, and obtaining or applying any promotions for the product at the particular store before or during a purchase of the product with the particular store.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    receiving, by a server, a redirected bowser request from a link associated with a source when a user clicks on the link from search results for a search using a browser;
    obtaining, by the server, location data for a device executing the browser, wherein the location data is obtained from data associated with the browser and provide with the redirected bowser request in the link;
    interacting, by the server, with the source using search terms from the search and the location data, and obtaining information for a product identified in the link from the source, wherein the server utilizes an integration manager to provide customized web pages for retailers subscribed to integration services provided by the server, the integration manager being specifically configured to dynamically generate and render within the browser a customized shopping experience based on real-time location data and search terms; and
    rendering, by the server, the information within a customized web page rendered within the browser in response to the user clicking the link from the search results.

2. The method of claim 1, wherein rendering further includes generating the customized web page with a first link to product inventory for the product with the source.

3. The method of claim 2, wherein generating further includes generating the customized web page with a second link to store locations associated with the product.

4. The method of claim 3, wherein generating further includes generating the customized web page with a third link to discounts offered by the source for purchase of the product.

5. The method of claim 4, wherein generating further includes generating the customized web page with a fourth link to purchase the product from the source.

6. The method of claim 5, wherein generating further includes generating the customized web page with a fifth link to pay for the product later and view current availability options for the product.

7. The method of claim 1, wherein receiving further includes obtaining metadata associated with the user clicking the link within the browser from the search results.

8. The method of claim 7, wherein receiving further includes identifying within the metadata a current location of a user device that the user was operating when the user clicked the link within the browser based on the location data.

9. The method of claim 8, wherein rendering further includes using the current location to customize the information for the product within the customized web page.

10. The method of claim 7, wherein receiving further includes obtaining the search text used in the search by the user from the metadata.

11. The method of claim 10, wherein receiving further includes identifying a product identifier for the product and a source identifier for the source from the link, the search text, or the metadata.

12. A method, comprising:
    identifying, by a server, a redirected link from a bowser associated with results of a search conducted by a user using the browser;
    determining, by the server, from the redirected link and metadata associated with the redirected link, the search, search terms used in the search, location data for a device that executes the browser, and a product identifier for a product and a source identifier for a source that provides the product;
    interacting, by the server, with a source system of the source using the search terms and the location data to obtain information for the product using the product identifier, wherein the server utilizes an integration manager to provide customized web pages for retailers subscribed to integration services provided by the server, the integration manager being specifically configured to dynamically generate and render within the browser a customized shopping experience based on real-time location data and search terms; and
    rendering, by the server, a customized web page within the browser of the user with at least the information obtained from the source system.

13. The method of claim 12, wherein rendering further includes generating a plurality of links provided within the web page for different levels of the information and other information associated with the product and the source.

14. The method of claim 12, wherein determining further includes obtaining cookie data from the browser.

15. The method of claim 12, wherein determining further includes identifying a current location of a user device associated with the browser from the metadata.

16. The method of claim 12, wherein interacting further includes identifying an application programming interface (API) associated with the source system and interacting with the source system using the API.

17. The method of claim 12, wherein determining further includes obtaining the search text used by the user with the search from the metadata.

18. The method of claim 17, wherein obtaining further includes identifying the product identifier from the metadata and the search text.

19. A system, comprising:
    a server that comprises a processor;
    the processor executes instructions that cause the processor to perform operations comprising:
        receiving redirected links clicked by users from search results of searches conducted by the users within browsers of user devices;

obtaining metadata for the links, the searches, search terms for each search, and location data for the user devices that execute the browsers;

identifying products and sources of the products from the metadata;

interacting with source systems of the sources using corresponding search terms for corresponding searches and using corresponding location data for corresponding user devices to obtain product information for the products, wherein the server utilizes an integration manager to provide customized web pages for retailers subscribed to integration services provided by the server,, the integration manager being specifically configured to dynamically generate and render within the browser a customized shopping experience based on real-time location data and search terms;

generating customized web pages using the product information with a plurality of links included in the customized web pages to different portions of the product information; and rendering the customized web pages within the browsers of the user devices of the users responsive to the users clicking on the redirected links of the search results within the browsers.

20. The system of claim 19, wherein the users conduct the searches within the browsers using an internet search engine or a social media search engine provided via a social media platform through the browsers.

* * * * *